Jan. 24, 1961  R. W. PINNES  2,969,032
SUBMERSIBLE GROUND-EFFECT MACHINE
Filed Aug. 31, 1959

Inventor
ROBERT W. PINNES
By R. S. Tompkins
Attorney

United States Patent Office 2,969,032
Patented Jan. 24, 1961

2,969,032

SUBMERSIBLE GROUND-EFFECT MACHINE

Robert W. Pinnes, 4421 Faroe Place, Rockville, Md.

Filed Aug. 31, 1959, Ser. No. 837,298

7 Claims. (Cl. 114—16)

(Granted under Title 35, U.S. Code (1952), sec. 266)

The invention described herein may be manufactured and used by or for the Government of the United States of America for governmental purposes without the payment of any royalties thereon or therefor.

The present invention relates to ground-effect machines and more particularly to a ground-effect machine with submarine capabilities.

The general concept of a conventional ground-effect machine is not new. Broadly, a ground-effect machine is a device designed to utilize the phenomenon of "ground-effect." This "ground-effect" phenomenon is based upon the fact that when an annular jet is discharged downwardly from the base of a device in relatively close proximity to the ground, a lift force greater than the jet reaction force will be realized. This added lift is a product of the creation of a high-pressure air bubble beneath the base of the device. In this manner the device or machine actually rides on a cushion of air.

It should be readily appreciated that proximity to the surface is a prime requisite to the operation of any device designed as a ground-effect machine. The jet discharge need not be truly annular so long as it is in the shape of a closed plane curve or even polygonal in shape.

In the case of the present invention a modification and extension of the ground-effect machine is contemplated. As presently conceived, the conventional ground-effect machine is operable in air over the water. Herein this concept has been extended to produce a ground-effect machine that can also operate under water, a submersible ground-effect machine. When it would be desirable to so operate the machine, it would be allowed to sink into the water where when submerged it would be operated as a submarine with propulsive power being supplied by a water propeller. Any conventional submarine submersion and propulsion systems could be used. Nuclear energy would appear attractive as a source of power. When desired, the machine could surface and operate as a surface vessel or rise out of the water and operate as a conventional ground-effect machine. Thus, in a single vehicle the present invention provides the characteristics of a submarine, a surface ship, and an aircraft a concept which has, to date, been considered impracticable. As an indication of the importance of such flexibility in naval applications, it would appear that such a device would make an attractive vehicle for anti-submarine warfare.

This concept of a submersible ground-effect machine differs from the concept of causing a submarine to become airborne by providing it with helicopter rotors, a concept which is recognized as being an old one. Such an application as the latter, however, has no practical significance to one skilled in the art. To be effective in lifting a submarine out of the water in such a manner the downwash of the helicopter rotors must be able to act upon the water. Inherent in the requisite location of the rotor or rotors above the submarine is the reduced effectiveness thereof for as the rotors revolve over the submarine the downwash would in great part impinge on the hull of the submarine and cancel itself out. In attempting to overcome this deficiency the rotor blades would have to be very long so that they would extend out far past the hull to enable downwash to act on the water. Thus, the power demands of such long rotors would in turn necessitate the use of such a large power plant that two conditions aggravated thereby would defeat the concept. First, the weight of the power plant would be prohibitive and second, the necessary increase in the size of the hull to house the mammoth power plant would force the use of still longer and even more unwieldly rotors thereby creating a never-ending self-defeating cycle.

In the present invention, however, the size of the hull cannot detract from the effectiveness of the annular jet (other than to dictate power requirements as to lift). Further, since the present invention is restricted to use in producing flight in proximity to the surface of the water, the augmented lift realized from the ground-effect principle is the critical element determining the practicality of the entire concept.

Therefore an object of the present invention is the provision of a submersible ground-effect machine.

Another object is to provide a vehicle for anti-submarine warfare having the characteristics of a submarine, a surface ship, and an aircraft.

A further object is to provide a vehicle having such flexibility of operation as to be susceptible of employment in the execution of specific missions in the air, on the water or under the water.

Other objects and many of the attendant advantages of this invention will be readily appreciated as the same become better understood by reference to the following detailed description when considered in connection with the accompanying drawings wherein.

Figure 1:
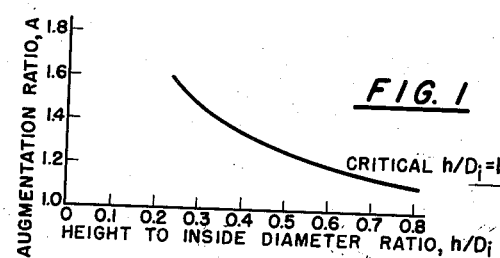
Fig. 1 shows the relationship between augmentation ratio and $h/D_1$ value for a typical ground-effect machine.
Figure 2:
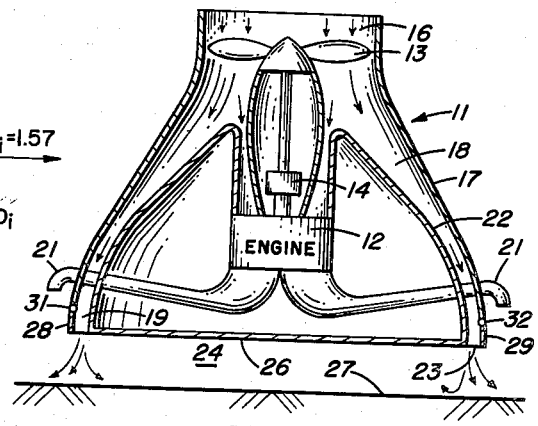
Fig. 2 shows a conventional ground-effect machine in cross-section in hovering position over the ground.

Referring now to the drawings, wherein like reference characters designate like or corresponding parts throughout the several views, the graph in Fig. 1 shows the relationship between the augmentation ratio and $h/D_1$ value for typical ground-effect machine such as is shown in Fig. 2. Briefly, augmentation ratio is the total lift force produced on such a machine in close proximity to the ground divided by the jet thrust of an equivalent circular nozzle operating at an altitude out of the ground cushion. The letters in $h/D_1$ represents the ratio of the height ($h$) of the nozzle discharge plane above the ground or water to the inside diameter ($D_1$) of the annular jet or the effective inside diameter of a circle of equivalent area in the case of a non-circular nozzle. At the present time the available test data stops at $h/D_1=0.23$ but it can be readily seen from the graph that the augmentation ratio increases as the machine operates closer to the ground. This relationship of increasing augmentation ratio (and therefore total lift) as the machine operates closer to the ground is believed to continue until it reaches a maximum and then drops off sharply as $h$ approaches zero. As the value of $h/D_1$ increases as the machine operates higher above the ground this particular nozzle reaches a critical value at $h/D_1=1.57$. At values of $h/D_1$ greater than 1.57 the ground-effect ground cushion collapses and therefore the ground-effect is lost. Thus, the criticality of operation in close proximity to the ground is shown by analysis of Fig. 1. Since a variety of nozzles will have a variety of critical $h/D_1$ values the present example is merely illustrative.

Referring now to Fig. 2 there is shown schematically a conventional ground-effect machine 11, powered with engine 12 driving ducted fan 13 through reduction gear 14. Air is drawn in through intake or duct 16 into exterior housing 17 by ducted fan 13 and pumped down through vertical well 18 to be discharged from annular nozzle 19 as indicated by the arrows. Exhausts 21, 21 shown passing from engine 12 through hull 22 conduct gases from engine 12 to the exterior of machine 11.

Annular jet 23 serves the dual function of creating and maintaining a ground cushion regime in the region 24 beneath base 26. Although jet 23 tends to entrain air both from region 24 and from the volume of air to the outside of jet 23, when the jet impinges on the ground 27, it impinges at a shallow angle so that part of the jet air is fed back into region 24 replacing the air lost therefrom due to entrainment. Fig. 2 shows a simple machine with only one fan and one engine, however, the same discussion applies to a larger machine using a multiplicity of fans and engines.

In operation, when machine 11 is close to the ground, lift forces acting on base 26 considerably in excess of the momentum of jet 23 are obtained. Forward motion can be obtained by using a separate forward thrust engine (not shown), by employing a portion of the air from the sustaining engine diverting it for propulsion (not shown) or by tilting the vehicle or using pivoted vanes such as vanes 28, 29 hinged at 31 and 32 in the jet exits.

Figure 3:
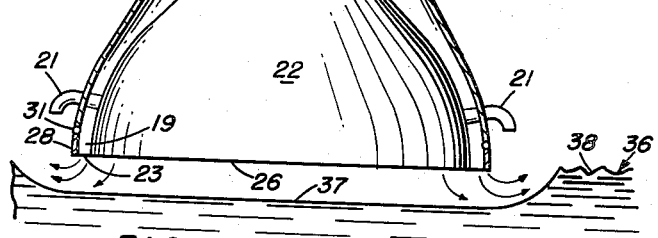
Fig. 3 shows the same ground-effect machine partially in cross-section in hovering position over water.

Fig. 3 shows machine 11 operating over water 36. As indicated, because of the nature of the free surface of the water and since there is a positive pressure beneath base 26, a differential height of water will exist between the surface level 37 beneath the machine 11 and the surface 38 surrounding it. Consequently, machine 11 will be hovering over a dished-out section of water.

Figure 4:
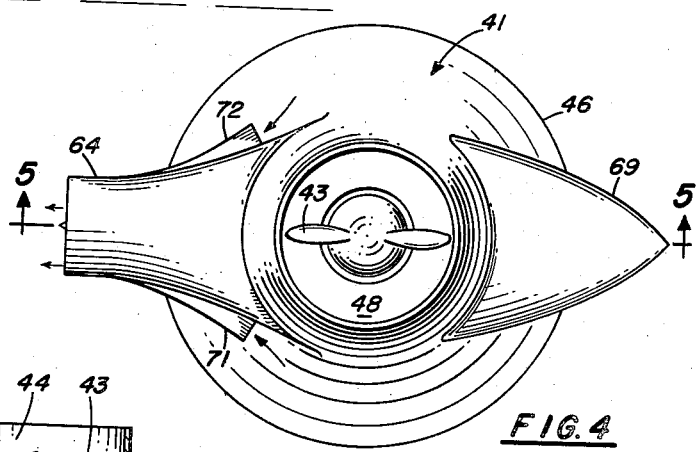
Fig. 4 is a plan view of the present submersible ground-effect machine.
Figure 5:
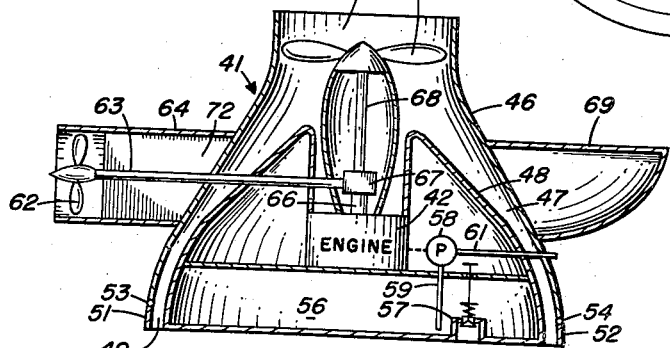
Fig. 5 shows a section taken through the submersible ground-effect machine of Fig. 4 on line 5—5.

In Figs. 4 and 5 a submersible ground-effect machine as contemplated by the present invention is shown schematically. As can be seen, many parts of machine 41 are essentially the same as on conventional machine 11. Thus, machine 41 has a power plant 42, ducted fan 43, duct or intake 44, exterior housing 46, vertical well 47, hull 48, annular nozzle 49, vanes 51 and 52 and hinges 53 and 54. The differences are that hull 48 must be a water-tight enclosure and be provided with flooding tanks such as tank 56 having valves such as valve 57 to control the admission of water to implement submersion and also pump 58 and pipes 59 and 61 for emptying water from tank 56 for resurfacing machine 41. Further, underwater propulsion means are required such as water propeller 62 mounted on propeller shaft 63 in housing extension 64. Power plant 42 turns drive shaft 66 which through conventional clutch and reduction gear unit 67 is adapted to drive either shaft 63 for water propulsion or to drive fan shaft 68 to power ducted fan 43. If desired, a separate power source and reduction gear may be employed.

Forward section 69 is provided to help balance machine 41 and to act as a fairing for underwater travel. When machine 41 is operated as a submarine water enters inlets 71, 72 and is then ejected by water propeller 62.

Thus, while in air over water machine 41 is operated as a conventional ground-effect machine. When desired the operation can be converted to submarine activity by simply stopping ducted fan 43 by disconnecting it from power plant 42 and allowing machine 41 to sink into the water. Tank 56 is flooded by opening valve 57 and the machine 41 sinks into the water. Power is then supplied to propeller 62 for propulsion under water. A snorkel (not shown) can be used to provide air for the engine 42 and obviously, any conventional submarine propulsion system could be used. When overwater operation (or operation over land, ice or snow) is desired, machine 41 operation over land, ice or snow) is desired, machine 41 surfaces and when fan 43 is out of the water it is powered by clutching fan shaft 68 to drive shaft 66 through unit 67. Machine 41 will then rise out of the water and proceed at the speed of the conventional ground-effect machine rather than at the relatively slow speed of a submarine. Intermediate operation as a surface ship could, of course, also be obtained if desired.

Obviously many modifications and variations of the present invention are possible in the light of the above teachings. Numerous embodiments and arrangements can be produced by employing a multiplicity of engines and fans so disposed circumferentially as to provide space for fuel, cargo, crew and any additional equipment required for specific missions. It is therefore to be understood that within the scope of the appended claims, the invention may be practiced otherwise than as specifically described.

What is claimed is:

1. A submersible ground-effect machine comprising in combination a housing, a waterproof hull supported within said housing and spaced therefrom to define a vertical well, said well communicating with the atmosphere below said machine through an annular nozzle and communicating with the atmosphere above said machine through a substantially circular duct, a fan mounted in said duct on a substantially vertical shaft projecting from said hull, said vertical shaft being detachably coupled to a source of power whereby said fan may be driven to pump air down through said well and out said nozzle in an annular jet thereby creating and maintaining an air cushion beneath said hull, and underwater propulsion means detachably coupled to said source of power whereby when said fan is uncoupled from said power source while said machine is over water and said machine has been submerged, said machine may be propelled under water.

2. A submersible ground-effect machine as described in claim 1 in which the waterproof hull has a compartment in the lower portion thereof which may be flooded to affect submersion of said machine.

3. A submersible ground-effect machine comprising in combination housing means, waterproof enclosure means supported within said housing means and spaced therefrom to define a well, said well communicating with the atmosphere below said machine through a nozzle the discharge periphery of which nozzle extends in a closed plane curve, said well further being open to the atmosphere above said machine, air-pumping means mounted in said well, said air-pumping means being detachably coupled to a source of power located within said waterproof enclosure means whereby air may be pumped downwardly through said well and be discharged from said nozzle to create and maintain an air cushion regime beneath said waterproof enclosure means, and underwater propelling means extending rearwardly of said machine, said underwater propelling means being detachably coupled to said source of power whereby said air-pumping means is uncoupled from said power source while said machine is over water and said machine is then submerged, said machine may be propelled by said propelling means.

4. A submersible ground-effect machine as described in claim 3 in which the waterproof enclosure means has a compartment in the lower portion thereof which may be flooded to affect submersion of said machine.

5. A submersible ground-effect machine as described in claim 3 in which the housing means is provided with a rearward extension to enclose the underwater propelling means, said rearward extension being provided with water inlets, said housing means being further provided with a forwardly projecting fairing section.

6. A submersible ground-effect machine as described in claim 5 in which the housing is provided with means for causing said machine to move in substantially horizontal direction in air.

7. A submersible ground-effect machine as described in claim 6 in which the means for causing horizontal movement comprises pivoted vanes located at the exit of the nozzle.

References Cited in the file of this patent

UNITED STATES PATENTS

| | | |
|---|---|---|
| 2,444,332 | Briggs et al. | June 29, 1948 |
| 2,720,367 | Doolittle | Oct. 11, 1955 |

OTHER REFERENCES

"Aviation Week" of Apr. 27, 1959, page 32.
"Iron Age" of Apr. 3, 1958, page 68.